July 24, 1951  S. WALLACE  2,561,546
PULLEY MOUNTING AND ADJUSTING DEVICE FOR
VARIABLE SPEED TRANSMISSIONS
Filed July 28, 1947  2 Sheets-Sheet 2
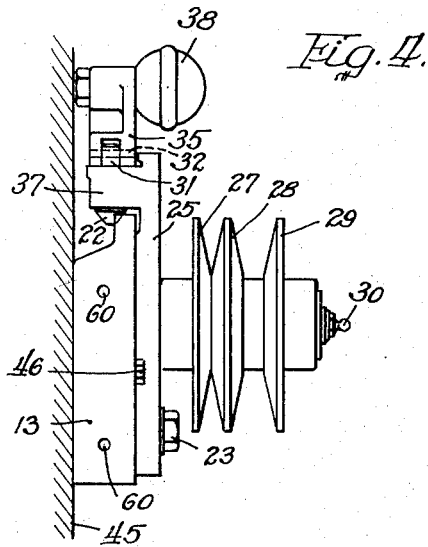
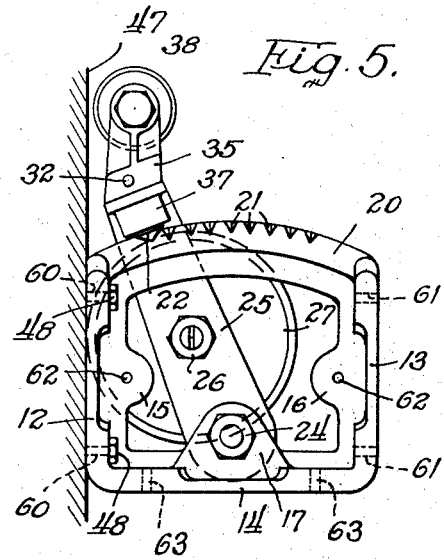
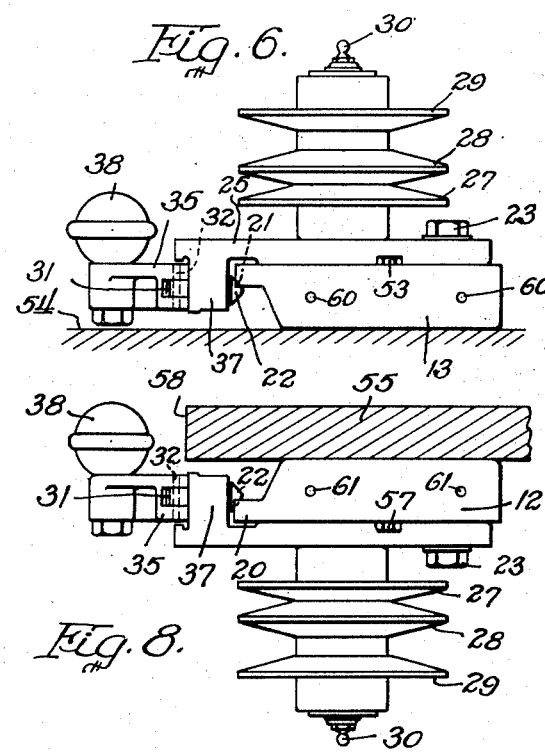
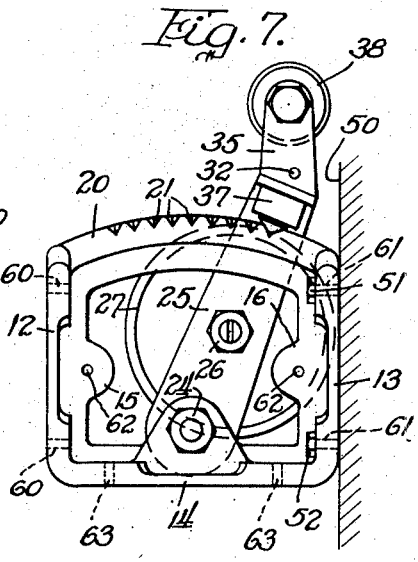
Inventor:
Stanley Wallace.
By
his Atty.

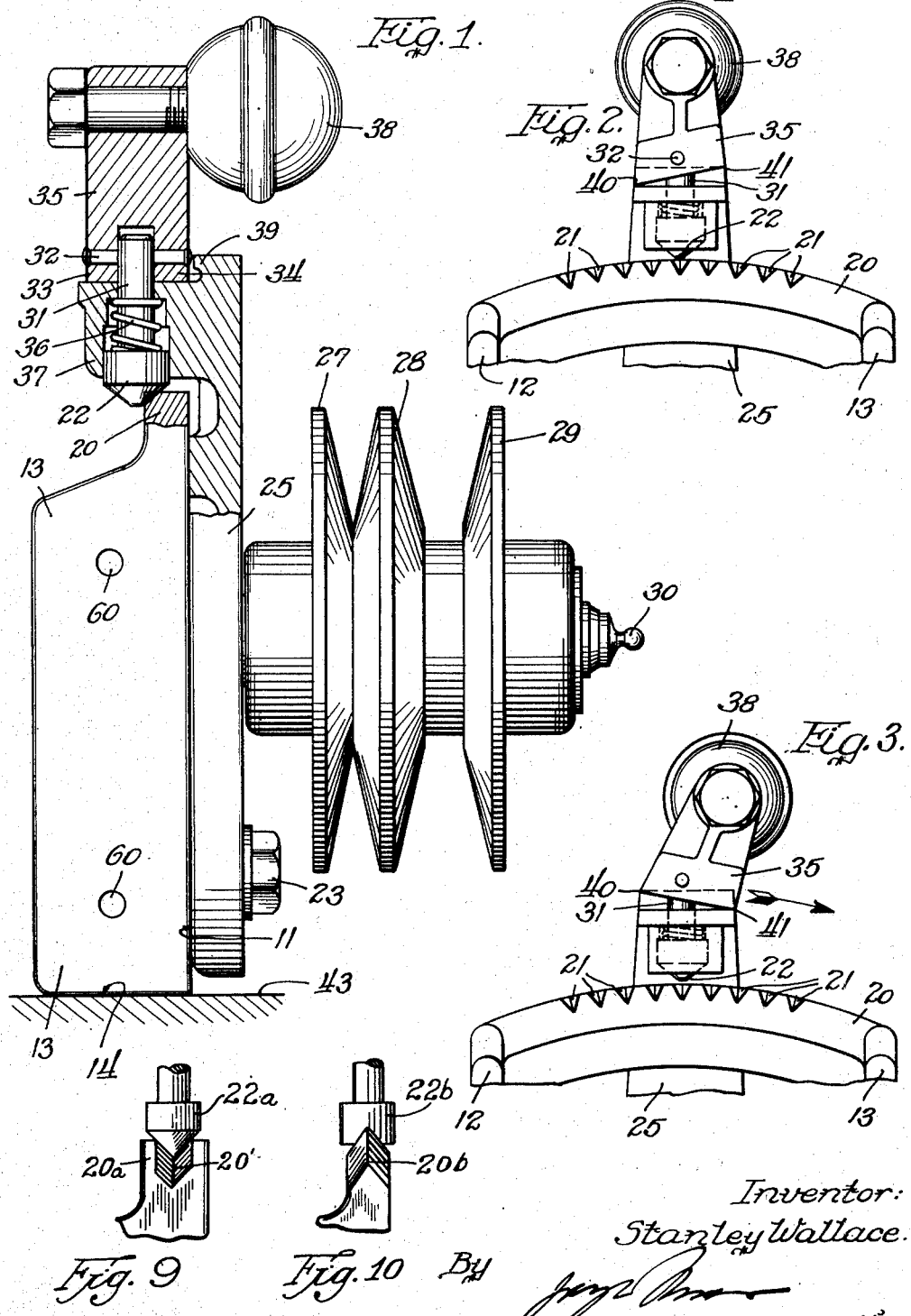

Patented July 24, 1951

2,561,546

UNITED STATES PATENT OFFICE 2,561,546

PULLEY MOUNTING AND ADJUSTING DEVICE FOR VARIABLE-SPEED TRANSMISSIONS

Stanley Wallace, Des Plaines, Ill.

Application July 28, 1947, Serial No. 764,196

18 Claims. (Cl. 74—230.17)

This invention is concerned with a device for mounting expansible pulleys and for adjusting the position thereof relative to the driving and driven pulleys of a variable speed transmission.

An object of the invention is to produce a novel universal mounting device for expansible pulleys, whereby such pulleys may be secured in position for coaction with their driving and driven pulleys, either on a suitable structural member forming a surface which extends in a plane perpendicular to the axis of the pulley shaft or on a suitable structural member forming a surface which extends in parallel with the axis of the pulley shaft.

Another object is to provide a novel device for adjusting and securing the adjusted angular position of the pulley holder on its mounting, for the purpose of varying the speed ratio between the driving and driven pulleys as desired.

The various objects and features of the invention, including the objects noted above, will be brought out in the course of the detailed description of an embodiment of the invention which is presented below, with reference to the accompanying drawings. In these drawings, Fig. 1 is a side view of the new mounting device, with some parts in section, to illustrate details;

Fig. 2 shows, on a somewhat reduced scale, the adjusting means of the device when the same is operated in one direction of angular adjustment;

Fig. 3 shows, on the same scale as Fig. 2, the adjusting means when operated in the other direction of angular adjustment;

Figs. 4–8 show, on further reduced scales, various ways in which the device may be mounted on suitable structural members forming surfaces which extend either perpendicular to the axis of the pulley shaft or in parallel therewith; and Figs. 9 and 10 show in fractional views modifications of some details.

Like parts are numbered by like reference numerals. Known details and elements will be referred to only to the extent required for pointing out the invention.

The new mounting device comprises a frame having a front wall 11 forming the face thereof and rearwardly extending flangelike side walls 12—13 connecting with a flangelike bottom wall 14. Part of the front wall is cut out, leaving an opening, as shown particularly in Figs. 5 and 7, for the purpose of reducing the weight of the mounting. The opening forms inwardly extending pads 15—16 constituting mounting members and a similarly inwardly extending pad projecting from the bottom wall 14. The upper edge 20 of the front wall is arcuately shaped, as particularly seen in Figs. 2, 3, 5 and 7, forming an index member which is provided with a number of index notches indicated by numeral 21. These notches serve the purpose of locking a spring-biased index finger 22 in angularly adjusted position.

Pivotally secured to the face of the device by means of a journal bolt 23, which is held by a nut 24, is the pulley holder or arm 25. This holder carries the pulley shaft which is secured thereto by means of the nut 26 (see Figs. 5 and 7). Three pulley disks 27, 28, 29 are rotatably mounted on the pulley shaft. The pulley disks 27 and 29 are rotatable on the shaft in common, and the center pulley disk 28 is independently rotatable and is also axially movable relative to the inner faces of the pulley disks 27 and 29. Numeral 30 indicates a grease fitting for lubricating the pulleys. The disks form an expansible pulley which, as such, is well known and widely used for varying the speed ratio between driving pulleys and driven pulleys. For example, a V-belt may be disposed between the pulley disks 27—28 connecting with a driving pulley, and another V-belt may be disposed between the pulley disks 28—29, connecting with a driven pulley. If the axial position of the expansible pulleys is changed on the pulley shaft with respect to the axes of the driving and driven pulleys, the speed ratio will be changed accordingly. It is understood, of course, that different types of pulleys may be secured to the holder.

The free end of the pulley holder 25 is provided with an enlargement 37 laterally rearwardly extending therefrom and overlapping the arcuate index member 20. A recessed boring is formed in the enlargement, as particularly shown in Fig. 1, in which is disposed the plungerlike index finger 22. The shank 31 of the index finger extends outwardly from the free end of the enlargement 37.

An actuating member 35 is pivotally secured to the outer end of the shank 31 of the index finger by means of a pin 32 which engages the legs 33—34 formed by a slot in the inner end of the actuating member 35. A spring 36 is disposed between the head of the index finger 22 and the bottom of the recessed opening in the free end of the enlargement 37. Accordingly, the pressure of the spring tends to bias the index finger 22 inwardly toward the notched arcuate index member 20, thus holding the inner end thereof in engagement with one of the depressions or notches 21 to secure the angular adjustment of the pulley holder 25 on the face of the mounting frame. The inner ends of the legs 33—34 of the actuating member 35 form surfaces which are in normal position of the actuating member in camming engagement with a coacting surface formed by the enlargement 37. At the free end of the actuating member 35 is provided the knob 38. The pulley holder forms a ledge 39 adjacent the inner end of the actuating member 35 at one side thereof. The actuating member is thus resiliently held in normal position with its inner end in camming engagement with the enlargement 37. It may be tilted on the enlargement responsive to lateral pressure applied to the knob 38, with its edge forming a sliding pivot on the surface of the enlargement, to lift the index finger 22, but is held against angular outward displacement by the ledge 39.

The device may be mounted in any one of numerous positions, for example, in vertical position as shown in Fig. 1, on a surface 43 which may be the top surface of a work bench or the like.

The adjusting device, including the actuating member 35, operates as follows:

When it is desired to move the pulley holder 25 in the direction of the arrow shown in Fig. 2, lateral pressure in corresponding direction is applied to the knob 38, to displace the actuating member 35 angularly from its normal position, as shown, for example, in Fig. 5, to its operated position shown in Fig. 2. The member is tilted against the pull of the spring 36, the left edge of its inner end serving as a pivot against the coacting surface of the enlargement 37, lifting the index finger 22 outwardly, out of engagement with the particular notch 21 in which it may have been previously placed. In other words, the adjusting member 35 tilts in counter-clockwise direction on its edge 40, as shown in Fig. 2, lifting the index finger 22 from engagement with the locking notch. Further lateral pressure applied to the knob 38 in the direction of the arrow shown in Fig. 2 displaces the holder 25, and therewith the pulleys carried thereby, to a desired angular position in which the desired speed ratio is obained. The actuating member 35 is then released and tilts back into its normal position, as shown in Fig. 5, thereby releasing the index finger 22 into locking engagement with a corresponding notch 21.

When it is desired to obtain a speed adjustment requiring angular displacement of the holder 25 in contrary direction, that is to say, in the direction of the arrow shown in Fig. 3, lateral pressure is applied to the knob 38 in corresponding direction to tilt the actuating member 35 with its edge 41 as pivot point, thereby again lifting the index finger 22 out of locking engagement with a particular index notch. Further lateral pressure put on the knob 38 results in angular shifting of the holder 25, and therewith the expansible pulleys, to the desired position. The knob 38 is then released, releasing the actuating member 35 to normal, thus causing the index finger 22 to snap into one of the index notches 21 which corresponds to the angular position to which the holder 25 has been advanced.

When the device is mounted on a surface 43 which extends below and in parallel with the axis of the expansible pulleys, as shown in Fig. 1, screws or bolts are used which extend through suitable holes 63 in pads formed by the bottom flange or wall 14, as indicated in Figs. 5 and 7.

It may be desirable to mount the device on a suitable structural member forming the surface 45, shown in Fig. 4, which extends perpendicular to the axis of the pulley shaft. The structural member may be a wall or the leg of a bench or the like. The device is in such case secured by means of screws 46, one on each side of the front wall, the screws extending through holes 62 in the pads 15 and 16 projecting inwardly from the side walls of the frame.

It may also be desirable to mount the device with the outer surface of the side wall or flange 12 in engagement with a structural member forming the surface 47, as shown in Fig. 5. Such mounting is accomplished by means of screws or bolts 48 which extend through holes 60 in the mounting pads formed by the flangelike side wall. It will be observed that the actuating member 35 extends at an angle from the pivotally mounted pulley holder 25, and that this actuating member, in the extreme adjusted position shown in Fig. 5, clears the mounting surface 47.

In case it is desired to mount the device with the outer surface of the side wall 13 in engagement with a mounting surface 50, as shown in Fig. 7, this may be done by the use of bolts or screws 51—52 extending through holes 61 provided in the mounting pads formed in the flangelike side wall. Prior to mounting the device in this particular position it will, however, be necessary to change the position of the actuating member 35 on the pulley holder 25. The actuating member is first removed from its position shown in Fig. 5 by releasing the pin 32, and is turned around by 180° and re-mounted to assume the position shown in Fig. 7. The knob 38 is likewise removed and re-mounted to project from the other side of the actuating member. When the position of the actuating member and the knob is thus changed, they will clear the mounting surface 50 in the extreme angularly adjusted position of the pulley holder, as shown in Fig. 7.

The device may also be mounted on top of a work bench or the like, forming the surface 54, as shown in Fig. 6. Such mounting is accomplished by screws or bolts 53 extending through the holes 62 in the pads 15 and 16 on the face of the frame.

The device may be similarly mounted in inverted position, depending from a structural member 55 which may be a bench or the like. The mounting is secured by means of bolts or screws such as 57 shown in Fig. 8. If the structural member 55 terminates at the left, as indicated by the edge 58, no further adjustment will be required. If the member 55, however, extends further to the left, it will be necessary to change the position of the knob 38 to depend from the actuating member 35 downwardly instead of pointing upwardly as shown.

A particular arcuate index member 20 having index depressions or notches 21 has been shown only for the sake of convenience. Holes or suitable other depressions may be substituted for the notches.

The index member may also have a laterally or angularly extending arcuate surface for frictional engagement with a coacting surface of a suitably modified index finger. For example, as shown in Fig. 9, a V-notch 20' may be provided in the arcuate index member 20a for frictional engagement with a V-shaped index finger 22a, or, alternatively, as shown in Fig. 10 the index member 20b may form an arcuate ridge which may be V-shaped in cross-section for frictional engagement with an index member 22b forming a correspondingly shaped cutout or depression. Modifications providing for frictional engagement of the index finger with the arcuate index member will provide for angular adjustment of the pulley holder in infinite increments of angular displacement.

Changes may be made within the scope and spirit of the appended claims.

I claim:

1. A device for adjusting the angular position of a pivotally mounted pulley holder, said device comprising a frame forming an arcuately shaped index member carrying a plurality of angularly spaced index depressions, means for pivotally mounting said holder on said frame, a movable index finger carried by said holder within a cavity formed thereby, an adjusting member forming a camming surface, means for pivotally coupling said adjusting member directly with the outer end of said index finger so that it is angularly movable with respect to and away from the axis thereof, and spring means for biasing said index finger normally axially inwardly, thereby holding the camming surface of said adjusting member in normal position in engagement with a coacting surface formed by said holder and causing the inner end of said index finger to engage one of said index depressions corresponding to the angular position of said holder.

2. A device for adjusting the angular position of a pivotally mounted pulley holder, said device comprising a frame forming an arcuately shaped index member carrying a plurality of angularly spaced index depressions, means for pivotally mounting said holder on said frame, a movable index finger carried by said holder within a cavity formed thereby, the ends of said index finger projecting from said cavity, an adjusting member forming a camming surface, means for pivotally coupling said adjusting member directly with the outer end of said index finger which projects from said cavity, and spring means within said cavity for biasing said index finger normally axially inwardly, thereby holding the camming surface of said adjusting member coupled with the index finger normally in engagement with a coacting surface formed by said holder and causing the inner end of said index finger to engage one of said index depressions corresponding to the angular position of said holder, said adjusting member being operative responsive to lateral pressure applied thereto to tilt with its camming surface on said coacting surface, thereby withdrawing the inner end of said index finger from engagement with said index depression and thereafter moving said pulley holder into desired angular position in which said lateral pressure is relaxed to allow return of said adjusting member to normal position and engagement of the inner end of said index finger with another one of said index depressions corresponding to the adjusted angular position of said holder.

3. The structure and combination defined in claim 2, wherein said adjusting member is normally disposed at an angle to the median center line extending through said pulley holder.

4. The structure and combination defined in claim 2, wherein an enlargement is formed on said pulley holder forming said cavity for said index fingers and also forming said coacting surface for engagement by the camming surface of said adjusting member.

5. The structure and combination defined in claim 2, together with an enlargement carried by said pulley holder substantially at the free end thereof, said enlargement forming the cavity for receiving said index finger and also forming the coacting surface for engagement by the camming surface of said adjusting member.

6. The structure and combination defined in claim 2, together with a lateral enlargement carried by said pulley holder near the free end thereof, said enlargement forming the cavity for receiving said index finger and also forming the coacting surface for engagement by the camming surface of said adjusting member, the free end of said holder forming a backing for one side of said adjusting member to prevent angular displacement thereof radially of said index finger.

7. A pulley mounting device comprising a frame forming a face plate, a pulley holder carrying a shaft pivotally mounted on said face plate, means on said mounting forming oppositely disposed mounting members for selectively securing said frame on suitable structural elements forming surfaces extending in planes which parallel the axis of said shaft, and an adjusting member associated with said pulley holder for locking such holder in adjusted angular position, said adjusting member being pivotally mounted on the pulley holder and extending therefrom at an angle to the median center line thereof to clear the surface of the structural element on which said mounting is secured when the pulley holder is in extreme operative limit position with its free end substantially adjacent the surface of such structural element.

8. The structure and combination defined in claim 7, together with means on said frame for alternatively securing the mounting on a suitable structural element forming a surface extending at an angle to the planes of said first noted oppositely disposed mounting members.

9. The structure and combination defined in claim 7, together with means on said frame forming a mounting for alternatively securing the frame on a suitable structural element forming a surface extending in a plane disposed perpendicular to the planes of said first noted oppositely disposed mounting members.

10. In combination, an index member forming an arcuately shaped index surface, a pivotally mounted holder, a device for angularly displacing said holder relative to said index surface, said device comprising an enlargement projecting from said holder in rearwardly overlapping relationship relative to said index surface, said enlargement forming a cavity disposed in parallel with the median center line of said holder and also forming a shelflike surface which is disposed in a plane extending perpendicular to said median center line, an index finger disposed in said cavity, the inner end of said index finger projecting from said cavity toward said index surface and the outer end thereof projecting therefrom and beyond said shelflike surface, an actuating member forming a slot for directly receiving the outer end of said index finger, means for directly pivotally coupling the outer end of said index finger with said actuating member, and spring means disposed in said cavity for axially inwardly biasing said index finger to hold the inner end thereof in locking engagement with said index surface and to maintain the inner end of said actuating member normally in engagement with said shelflike surface.

11. The structure and combination defined in claim 10, together with an extension projecting from said holder and overlapping the inner end of said actuating member on one side thereof to hold the actuating member against angular displacement radially of said index finger.

12. The structure and combination defined in claim 10, wherein said index surface is a ridge projecting from said index member, and wherein said index finger forms a cutout for frictional engagement with said ridge.

13. The structure and combination defined in claim 10, wherein said index surface is a groove formed in said index member for frictional engagement by said index finger.

14. In combination, means forming an arcuately shaped index member carrying a plurality of angularly spaced index depressions, a pivotally mounted holder, a device for angularly displacing said holder relative to said index member, said device comprising an enlargement projecting from said holder in overlapping relationship relative to said index member, said enlargement forming a generally cylindrical cavity disposed in parallel with the median center line of said holder and also forming a shelflike surface which is disposed in a plane extending perpendicular to said median center line, a plungerlike index finger disposed directly in said cavity, the inner end of said index finger projecting from said cavity toward said index member and the outer end thereof projecting therefrom and extending beyond the plane of said shelflike surface, an actuating member forming a slot for directly receiving the outer end of said index finger which projects beyond said shelflike surface, means for pivotally coupling the outer end of said index finger directly with said actuating member, spring means disposed in said cavity for axially inwardly biasing said index finger to hold the inner end thereof in locking engagement with one of said index depressions and to maintain the inner end of said actuating member normally in engagement with said shelflike surface, an extension projecting from said holder and overlapping the inner end of said actuating member on one side thereof to hold such member against angular displacement radially of said index finger, said actuating member being operative responsive to lateral pressure applied thereto to tilt on said shelflike surface with one edge of its inner end acting as a sliding pivot thereon, thereby lifting said index finger relative to said index member for the purpose of allowing angular displacement of said adjusting element.

15. The structure and combination defined in claim 14, wherein said actuating member is disposed on said adjusting element at an angle to the median center line thereof.

16. A pulley mounting of the class described comprising a frame forming a face plate, a holder pivotally secured to said face plate, a pulley shaft extending from said holder, and mounting means formed by said frame for selectively securing the mounting in planes extending perpendicular to the axis of said pulley shaft or alternatively in planes extending in parallel with the axis of said pulley shaft, said mounting means comprising side walls rearwardly extending from said face plate, said side walls forming pads disposed in parallel with said face plate.

17. A pulley mounting of the class described comprising a frame forming a face plate, a holder pivotally secured to said face plate, a pulley shaft extending from said holder, means formed by said frame and disposed in parallel with said face plate but spaced therefrom for securing the mounting on a support forming a surface which is disposed in a plane extending in parallel with the plane of said face plate, and means extending rearwardly perpendicularly from said face plate for securing said mounting selectively in any one of three alternate positions on corresponding supports each forming a surface which extends in a plane disposed in parallel with the axis of said pulley shaft.

18. A pulley mounting of the class described comprising a generally rectangular frame forming a face plate, a holder pivotally secured to said face plate, a pulley shaft extending from said holder, flangelike side and bottom walls extending perpendicularly rearwardly from said face plate, each of said walls forming mounting means for securing the mounting on a support forming a surface which is disposed in a plane extending in parallel with the axis of said pulley shaft, and means carried by some of said side walls forming padding for securing said mounting on a support forming a surface which is disposed in a plane extending perpendicular to the axis of said pulley shaft.

STANLEY WALLACE.

REFERENCES CITED

The following references are of record in the file of this patent:

UNITED STATES PATENTS

| Number | Name | Date |
|---|---|---|
| 1,550,416 | Barling | Aug. 18, 1925 |
| 2,070,618 | Olszewski | Feb. 16, 1937 |
| 2,235,122 | Shaw | Mar. 18, 1941 |
| 2,293,230 | Waltz | Aug. 18, 1942 |
| 2,399,583 | Suska | Apr. 30, 1946 |